(12) United States Patent
Ma et al.

(10) Patent No.: US 9,695,088 B2
(45) Date of Patent: Jul. 4, 2017

(54) MONOLITHIC GRAPHITIC CASTABLE REFRACTORY

(75) Inventors: Yuechu Ma, Columbus, OH (US); Douglas K. Doza, Plain City, OH (US); Timothy M. Green, Columbus, OH (US); Dana G. Goski, Columbus, OH (US)

(73) Assignee: ALLIED MINERAL PRODUCTS, INC., Columbus, OH (US)

( * ) Notice: Subject to any disclaimer, the term of this patent is extended or adjusted under 35 U.S.C. 154(b) by 428 days.

(21) Appl. No.: 13/216,007

(22) Filed: Aug. 23, 2011

(65) Prior Publication Data

US 2012/0052196 A1    Mar. 1, 2012

Related U.S. Application Data

(60) Provisional application No. 61/376,546, filed on Aug. 24, 2010.

(51) Int. Cl.
| | | |
|---|---|---|
| *B05D 7/00* | (2006.01) | |
| *C08K 3/04* | (2006.01) | |
| *C08K 3/34* | (2006.01) | |
| *C08L 95/00* | (2006.01) | |
| *B05D 5/00* | (2006.01) | |
| *C04B 35/66* | (2006.01) | |
| *C04B 35/52* | (2006.01) | |
| *C04B 35/532* | (2006.01) | |
| *F27D 1/00* | (2006.01) | |
| *F27D 1/10* | (2006.01) | |
| *F27D 1/16* | (2006.01) | |

(52) U.S. Cl.
CPC ............ *C04B 35/66* (2013.01); *C04B 35/522* (2013.01); *C04B 35/532* (2013.01); *F27D 1/0006* (2013.01); *F27D 1/10* (2013.01); *F27D 1/1636* (2013.01); *C04B 2235/3217* (2013.01); *C04B 2235/3222* (2013.01); *C04B 2235/3232* (2013.01); *C04B 2235/3241* (2013.01); *C04B 2235/3244* (2013.01); *C04B 2235/3418* (2013.01); *C04B 2235/3821* (2013.01); *C04B 2235/3843* (2013.01); *C04B 2235/3869* (2013.01); *C04B 2235/3873* (2013.01); *C04B 2235/402* (2013.01); *C04B 2235/424* (2013.01); *C04B 2235/425* (2013.01); *C04B 2235/428* (2013.01); *C04B 2235/48* (2013.01)

(58) Field of Classification Search
CPC .... C04B 2235/3217; C04B 2235/3222; C04B 2235/3232; C04B 2235/3241; C04B 2235/3244; C04B 2235/3418; C04B 2235/3821; C04B 2235/3843; C04B 2235/3869; C04B 2235/3873; C04B 2235/402; C04B 2235/424
USPC ....................................................... 106/38.22
See application file for complete search history.

(56) References Cited

U.S. PATENT DOCUMENTS

| | | | | |
|---|---|---|---|---|
| 4,387,080 A | * | 6/1983 | Hatta et al. .................... | 423/345 |
| 5,000,427 A | | 3/1991 | Iba et al. | |
| 5,346,942 A | | 9/1994 | Yamamura et al. | |
| 5,411,997 A | | 5/1995 | Ohara et al. | |
| 5,520,823 A | * | 5/1996 | Jones ................. | B01D 39/2093 |
| | | | | 210/496 |
| 2004/0128857 A1 | * | 7/2004 | Bell ........................ | B22C 9/086 |
| | | | | 34/480 |

FOREIGN PATENT DOCUMENTS

| | | | | |
|---|---|---|---|---|
| JP | 06-273065 | * | 9/1994 | ............... F27D 1/16 |
| JP | 09-295875 A1 | | 11/1997 | |
| JP | 2002-308677 A1 | | 10/2002 | |
| JP | 2004-002098 A1 | | 1/2004 | |
| JP | 2005-089247 A1 | | 4/2005 | |
| JP | 2005-132695 | * | 5/2005 | ............. C04B 35/66 |

\* cited by examiner

*Primary Examiner* — Shuangyi Abu Ali
(74) *Attorney, Agent, or Firm* — Porter Wright Morris & Arthur LLP

(57) ABSTRACT

A monolithic refractory castable material comprises from about 25 to about 80 weight percent of graphite, from about 1 to about 15 weight percent of a water dispersible, curable phenolic novolac resin, and from about 70 to about 15 weight percent of one or more refractory aggregates, based on the weight of the monolithic refractory castable material. The monolithic refractory castable material is water dispersible and may be delivered to a structure surface by casting, pumping, shotcreting or gunning processes. In one embodiment, the monolithic refractory castable material may be employed to install or replace a blast furnace lining.

20 Claims, No Drawings

MONOLITHIC GRAPHITIC CASTABLE REFRACTORY

RELATED APPLICATION

The present application claims priority under 35 U.S.C. 119 of U.S. Application Ser. No. 61/376,546 filed Aug. 24, 2010.

FIELD OF THE INVENTION

The present invention is directed to a monolithic graphitic castable refractory for high temperature applications that can be applied by a variety of techniques, including casting, gunnite, pumping or a shotcreting (wet gunning) process. The monolithic refractory can be applied easily as a replacement for carbon brick and is water friendly. The monolithic refractory has an advantageous combination of properties, including good thermal conductivity, volume stability, and thermal shock, alkali and abrasion resistance.

BACKGROUND OF THE INVENTION

Refractory carbonaceous linings are most commonly formed as carbon, semi-graphite or densified graphite brick. These bricks are formed by molding or pressing and firing operations. After forming, the bricks are assembled, for example, in metallurgical vessels, typically requiring long lead times from a manufacturer, highly skilled labor, and use of cutting tools to fit the brick.

Carbonaceous bricks are commonly used in operations such as blast furnace hearths to allow passage of heat to water cooling systems where conductive cooling is required. This passage of heat allows for a protective skull to form on the surface of the working lining with which the molten iron and slag can be contained. The balance of heat transfer and thermal conductivity can be maintained over long periods of time. The carbon brick is sometimes temporarily protected by the application of dense refractory brick or castable overlay of alumina and silicon carbide bearing low or no cement castables. Over time, degradation of the carbon brick lining can occur due to thermal cycling, oxidation, physical erosion, and/or attack by alkali, slag or iron, for example.

Graphite brick is typically manufactured from calcined low grade coal such as anthracite and synthetic, natural, flake or vein graphite with various additives (silicon carbide, for example). The bricks are molded under high pressure, sintered and machined to a final shape. Semi-graphite brick uses cleaner carbon sources, such as low ash containing calcined and/or semi graphitized coal (anthracite), pitch based binders and various additives for anti-oxidation and other property enhancements. Graphite brick or block is the lowest contaminant version and thus exhibits the highest thermal conductivity of these materials, typically using a higher quality, low-ash coke from petroleum sources, with pitch and phenolic resin. The graphite brick may also contain alumina, silicon carbide and other small additions of various additives.

One problem with all of these carbonaceous brick or block materials is that they require first a preforming (shaping) process, second, a heat treatment processes, and third, a milling or sizing process. Further, the bricks are often not precisely sized prior to ordering, whereby they must be cut to fit on site, adding to labor costs. These materials are expensive and to inventory enough of them for repair or reline of production vessels is an undesirable expense for the traditional customer base. This adds an additional problem with these materials, namely, the lead time required for preparation and installation. Finally, the brick must be abutted for a tight fit or mortared together, and thus, highly skilled labor is required for installation.

Carbon or graphite have also been used in other refractory applications. Graphite flake is a common base material for producing crucibles. Small amounts, typically from 1 to 3% by weight, of carbon fines and/or fine size graphite sources are commonly added to monolithic refractory castables, i.e., compositions of refractory aggregate mixed with a bonding agent which will develop structural strength and set, based on alumina and/or silicon carbide as a fine discontinuous phase filler. These additions are typically employed to modify properties such as high temperature wetting behavior or reactivity of the monolithic in classic applications, for example, blast furnace iron containment runners or foundry ladle monolithic castables.

Yamamura et al, U.S. Pat. No. 5,346,942, disclose a monolithic castable comprising refractory aggregates and novalac phenolic resin provided in an organic solvent. Often, the resin/solvent combination is considered a carcinogenic substance, banned at many commercial production facilities for environmental, health and safety reasons. In particular, high solvent levels are undesirable. Yamamura et al's system is also inconvenient as it does not cure at room temperature and thus has no strength until high temperatures are encountered.

It would therefore be advantageous to provide novel refractory materials that overcome limitations and/or disadvantages of the prior art.

SUMMARY OF THE INVENTION

Accordingly, it is an object of the present invention to provide improved refractory materials which overcome one or more limitation and/or disadvantages of conventional materials.

In one embodiment, the invention is directed to a monolithic refractory castable material which comprises from about 25 to about 80 weight percent of graphite, from about 1 to about 15 weight percent of a water dispersible, curable phenolic novolac resin, and from about 70 to about 15 weight percent of one or more refractory aggregates, based on the weight of the monolithic refractory castable material.

The invention is also directed to methods of applying a material to a structure surface. In one embodiment, the methods comprise mixing the monolithic refractory castable material of the invention and water, and delivering the resulting mixture to the structure surface via casting, pumping or shotcreting. In another embodiment, the methods comprise pneumatically conveying the monolithic refractory castable material of the invention to a location adjacent the structure surface, mixing the material with water, and delivering the resulting mixture to the structure surface via a nozzle.

Advantageously, the monolithic refractory castable materials of the invention are water dispersible, and bond and adhere to carbon-based surfaces and like material, allowing easy delivery to a surface and avoiding environmental concerns often encountered with organic solvent carriers. Additionally, the monolithic refractory castable materials of the invention have an advantageous combination of properties, including, good thermal conductivity, volume stability, and thermal shock, alkali and abrasion resistance.

These and additional objects, embodiments and advantages of the invention will be apparent from the detailed description.

DETAILED DESCRIPTION

The present invention is directed to monolithic refractory castable materials which are water dispersible and exhibit an advantageous combination of properties.

The present materials may be used, inter alia, as blast furnace linings and for repairing blast furnace linings, for example, to lengthen the service life of an existing lining and allow rapid repair of existing carbonaceous brick or block work. The present materials may also be employed as original linings or may be used to repair existing carbonaceous brick or machined carbonaceous work in any high temperature metallurgical or chemical processing vessel operations.

The present materials are water friendly, exhibit good pumpability and flow in processing equipment, for example, shotcrete equipment, bond and adhere to existing carbonaceous brick and to like materials. For example, the materials can be shotcreted on a surface and dried with low heat, e.g., from a turbo dryer. The materials exhibit good thermal conductivity, thermal shock resistance, strength, abrasion resistance, alkali resistance, and dry out ability.

The monolithic refractory castable materials are graphite-based. In one embodiment, the graphite is synthetic graphite, although other types of graphite, for example super graphite comprising crushed double densified graphite, or the like may be employed. The materials typically comprise from about 25 to about 80 weight percent of graphite, or, more specifically, from about 40 to about 80 weight percent of graphite, or, more specifically, from about 50 to about 70 weight percent of graphite. Unless otherwise stated, all weight percents described herein are based on the weight of the monolithic refractory castable material, prior to mixing with water. The graphite provides the compositions with good thermal conductivity. In a specific embodiment, the materials according to the invention, after application, prefiring in coke, have a thermal conductivity greater than about 5 W/mK, more specifically greater than about 10 W/mK, or more specifically greater than about 15 W/mK, for example after prefiring in coke at 2700° F. for 4 hours (½" diameter and ¼" thick disc size sample tested by Dynalene using a Laser Flash Analysis).

The monolithic refractory castable materials also comprise a water dispersible, curable phenolic novolac resin. To those skilled in the art, making an aqueous carrier work with graphite based systems is difficult because the graphite naturally is hydrophobic, and thus not highly wettable. The present invention overcomes this obstacle by use of the water dispersible, curable phenolic novolac resin. Such resins are known in the art and available from, for example, Hexion Specialty Chemicals, formerly Borden Chemical, under the Durite® line of products. See for example, the Gerber U.S. Pat. No. 6,046,252, which describes a water dispersible mixture of Durite® phenolic novolac resins of molecular weight 1000-1300 and molecular weight of 4000-8000 (2:8 weight ratio). Typically, the water dispersible phenolic novolacs resins are rendered curable by the inclusion of a curing agent therein. A suitable curing agent is hexamethylenetetramine ("hexa") which often is included in commercially available phenolic novolac resin, for example in an amount of about 1-10 weight percent, based on the resin, or, more specifically in an amount of about 4-6 weight percent, based on the resin. The resins are typically used in dry powder form and are included in the inventive compositions in an amount of from about 1 to about 15 weight percent, or, more specifically, from about 5 to about 10 weight percent.

The monolithic refractory castable materials further comprise one or more refractory aggregates in order to provide, inter alia, abrasion resistance and, optionally, other desired properties. The monolithic refractory castable materials typically comprise from about 70 to about 15 weight percent of the one or more refractory aggregates, or, more specifically, from about 50 to about 15 weight percent, or, more specifically, from about 35 to about 15 weight percent of the one or more refractory aggregates. In a specific embodiment, the one or more refractory aggregates comprise carbon black, pitch (natural and/or synthetic), SiC, $Al_2O_3$, $Cr_2O_3$, $ZrO_2$, $TiO_2$, $Si_3N_4$, $B_4C$, TiC, $CaO.6Al_2O_3$, $Si_2ON_2$ (silicon oxynitride), Sialon (ceramic alloys based on silicon, aluminum, oxygen and nitrogen), aluminum metal powder, copper metal flake, or silicon metal powder, or a mixture of two or more thereof. In another specific embodiment, the one or more refractory aggregates comprise from about 1 to about 40 weight percent SiC, and from about 1 to about 10 weight percent carbon black, pitch, $Al_2O_3$, $Cr_2O_3$, $ZrO_2$, $SiO_2$, $TiO_2$, $Si_3N_4$, $CaO.6Al_2O_3$, $B_4C$, TiC, $Si_2ON_2$, Sialon, aluminum metal powder or silicon metal powder, or a mixture of two or more thereof, based on the weight of the monolithic refractory castable material.

The monolithic refractory castable materials may optionally further comprise other materials conventionally employed in refractory materials for their known advantages, as desired. For example, the monolithic refractory castable materials may comprise up to about 10 weight percent of silica fume and/or up to about 10 weight percent of calcium aluminate and/or calcium oxide. Optionally, the monolithic refractory castable material may further comprise a dispersant, either organic or inorganic, or a mixture thereof, in an amount up to about 1 weight percent, or, more specifically, up to about 0.1 weight percent.

The monolithic refractory castable material may be mixed with water for delivery to a desired surface. Thus, in another embodiment, the invention is directed to a mixture of the monolithic refractory castable material with water. A sufficient amount of water is added to render the mixture castable, pumpable and/or shotcretable. In one embodiment, the monolithic refractory castable material is mixed with from about 1 to about 25 weight percent water, based on the weight of the monolithic refractory castable material. In a specific embodiment, the monolithic refractory castable material is mixed with from about 5 to about 15 weight percent water, based on the weight of the monolithic refractory castable material.

A method of applying a material to a structure surface in accordance with the invention comprises mixing the monolithic refractory castable material and water, and delivering the resulting mixture to the structure surface via casting, pumping or shotcreting. Alternatively, the monolithic refractory castable material may be applied by gunning, wherein the material is pneumatically conveyed to a location adjacent to the structure surface and mixed with water. The mixture is delivered to the structure surface via a nozzle. Such methods are suitable, inter alia, for installing or repairing a refractory lining on a blast furnace surface or a metallurgical or chemical processing vessel.

EXAMPLE

A composition is prepared comprising, on a weight basis, about 64% synthetic graphite, about 19% silicon carbide, about 6% alumina, about 2% calcium oxide, and about 9% water dispersible, curable phenolic novolac resin.

The composition is employed in laboratory shotcrete application and prefired in coke at 2700° F. and exhibits a Young's modulus of about 500,000 psi, a maximum strength of about 2600 psi, a thermal expansion coefficient ($10^{-6}$) of 4, and a thermal conductivity of about 15 W/mK.

The composition is lab shot in 2"×2"×2" cubes and prefired in coke to 2200° F. for 2 hours. Half the samples are thermal cycled 5 times at 1800° F. in coke in and out of the furnace. Cold crushing strength is measured on all samples and shows a loss of only about 16% in cold crushing strength as a result of the thermal cycling.

Lab samples obtained via the shotcreting method (wet gunned) are subjected to abrasion resistance according to ASTM C704. Volume lost ($cm^3$) in room temperature samples is 22.71 and in samples prefired at 2700° F. is 19.41.

The example and specific embodiments set forth herein are illustrative in nature only and are not to be taken as limiting the scope of the invention defined by the following claims. Additional specific embodiments and advantages of the present invention will be apparent from the present disclosure and are within the scope of the claimed invention.

What is claimed is:

1. An aqueous mixture of water and a monolithic refractory castable material, the monolithic refractory castable material comprising from about 40 to about 80 weight percent of graphite, from about 1 to about 15 weight percent of a water dispersible, curable phenolic novolac resin, and from about 50 to about 15 weight percent of one or more refractory aggregates, based on the weight of the monolithic refractory castable material, wherein the aqueous mixture comprises from about 1 to about 25 weight percent water, based on the weight of the monolithic refractory castable material, is free of organic solvent, is deliverable to a surface by pumping, shotcreting or gunning, and is settable to a solid form at room temperature after such delivery.

2. The aqueous mixture of claim 1, wherein the graphite comprises synthetic graphite.

3. The aqueous mixture of claim 1, wherein the monolithic refractory castable material comprises from about 5 to about 10 weight percent of the water dispersible, curable phenolic novolac resin, based on the weight of the monolithic refractory castable material.

4. The aqueous mixture of claim 1, wherein the one or more refractory aggregates comprise from about 1 to about 40 weight percent SiC, and from about 1 to about 10 weight percent carbon black, pitch, $Al_2O_3$, $Cr_2O_3$, $ZrO_2$, $SiO_2$, $TiO_2$, $Si_3N_4$, $B_4C$, TiC, $CaO.6Al_2O_3$, $Si_2ON_2$, Sialon, aluminum metal powder or silicon metal powder, or a mixture of two or more thereof, based on the weight of the monolithic refractory castable material.

5. The aqueous mixture of claim 1, wherein the monolithic refractory castable material comprises from about 50 to about 70 weight percent of graphite, from about 5 to about 10 weight percent of the water dispersible, curable phenolic novolac resin, and from about 35 to about 15 weight percent of the one or more refractory aggregates, based on the weight of the monolithic refractory castable material.

6. The aqueous mixture of claim 1, wherein the one or more refractory aggregates comprise carbon black, pitch, SiC, $Al_2O_3$, $Cr_2O_3$, $ZrO_2$, $SiO_2$, $TiO_2$, $Si_3N_4$, $B_4C$, TiC, $CaO.6Al_2O_3$, $Si_2ON_2$, Sialon, aluminum metal powder, copper metal flake, or silicon metal powder, or a mixture of two or more thereof.

7. The aqueous mixture of claim 1, wherein the monolithic refractory castable material comprises silica fume and the silica fume is included in an amount of up to about 10 weight percent, based on the weight of the monolithic refractory castable material.

8. The aqueous mixture of claim 1, wherein the monolithic refractory castable material comprises calcium aluminate and/or calcium oxide and the calcium aluminate and/or calcium oxide is included in an amount of up to about 10 weight percent, based on the weight of the monolithic refractory castable material.

9. The aqueous mixture of claim 1, wherein the monolithic refractory castable material further comprises up to about 1 weight percent of a dispersant.

10. A method of applying a material to a structure surface, comprising delivering the aqueous mixture of claim 1 to the structure surface via casting, pumping or shotcreting.

11. A method of installing or repairing a refractory lining on a blast furnace surface, comprising delivering the aqueous mixture of claim 1 to the blast furnace surface via casting, pumping or shotcreting.

12. A method of applying a material to a structure surface, comprising forming the aqueous mixture of claim 1 at a location adjacent the structure surface, and delivering the aqueous mixture to the structure surface via a nozzle.

13. A method of installing or repairing a refractory lining on a blast furnace surface, comprising forming the aqueous mixture of claim 1 at a location adjacent the blast furnace surface, and delivering the resulting mixture to the blast furnace surface via a nozzle.

14. An aqueous mixture of water and a monolithic refractory castable material, the monolithic refractory castable material comprising from about 40 to about 80 weight percent of graphite, from about 1 to about 15 weight percent of a water dispersible, curable phenolic novolac resin, from about 50 to about 15 weight percent of one or more refractory aggregates, and calcium aluminate and/or calcium oxide, wherein the calcium aluminate and/or calcium oxide is included in an amount of up to about 10 weight percent, based on the weight of the monolithic refractory castable material, wherein the aqueous mixture comprises from about 5 to about 25 weight percent water based on the weight of the monolithic refractory castable material, is free of organic solvent, is deliverable to a surface by pumping, shotcreting or gunning, and is settable to a solid form at room temperature after such delivery.

15. The aqueous mixture of claim 14, wherein the monolithic refractory castable material comprises from about 5 to about 10 weight percent of the water dispersible, curable phenolic novolac resin, based on the weight of the monolithic refractory castable material.

16. The aqueous mixture of claim 1, comprising from about 5 to about 15 weight percent water, based on the weight of the monolithic refractory castable material.

17. The aqueous mixture of claim 1, comprising from about 5 to about 25 weight percent water, based on the weight of the monolithic refractory castable material.

18. The aqueous mixture of claim 14, wherein the monolithic refractory castable material comprises silica fume and the silica fume is included in an amount of up to about 10 weight percent, based on the weight of the monolithic refractory castable material.

19. A method of applying a material to a structure surface, comprising delivering the aqueous mixture of claim 14 to the structure surface via casting, pumping or shotcreting.

20. A method of installing or repairing a refractory lining on a blast furnace surface, comprising delivering the aqueous mixture of claim 14 to the blast furnace surface via casting, pumping or shotcreting.

* * * * *